United States Patent
Belgaied et al.

(10) Patent No.: US 8,200,960 B2
(45) Date of Patent: Jun. 12, 2012

(54) TRACKING OF RESOURCE UTILIZATION DURING CRYPTOGRAPHIC TRANSFORMATIONS

(75) Inventors: Kais Belgaied, Sunnyvale, CA (US); Mark C. Powers, Park City, UT (US); Bhargava K. Yenduri, Santa Clara, CA (US); Darrin P. Johnson, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1048 days.

(21) Appl. No.: 11/584,195

(22) Filed: Oct. 20, 2006

(65) Prior Publication Data

US 2008/0098215 A1   Apr. 24, 2008

(51) Int. Cl.
*H04L 29/06* (2006.01)
(52) U.S. Cl. ...................................................... 713/160
(58) Field of Classification Search .................. 713/160
See application file for complete search history.

(56) References Cited

U.S. PATENT DOCUMENTS

| | | | | |
|---|---|---|---|---|
| 5,857,022 A | * | 1/1999 | Sudia | 713/173 |
| 7,370,348 B1 | * | 5/2008 | Patel et al. | 726/5 |
| 7,421,583 B1 | * | 9/2008 | Berson et al. | 713/170 |
| 2001/0034831 A1 | * | 10/2001 | Brustoloni et al. | 713/151 |
| 2003/0235168 A1 | * | 12/2003 | Sharma et al. | 370/338 |
| 2004/0024861 A1 | * | 2/2004 | Coughlin | 709/224 |

* cited by examiner

*Primary Examiner* — Jeffrey D Popham
(74) *Attorney, Agent, or Firm* — Park, Vaughan, Fleming & Dowler LLP; Steven E. Stupp (57) ABSTRACT

A computer system that communicates cryptographic resource utilization information while processing data packets is described. During operation, the system receives a first data packet and generates a second data packet by performing a cryptographic transformation on the first data packet. Next, the system appends auxiliary information to the second data packet. This auxiliary information includes information associated with cryptographic resource utilization during the cryptographic transformation. Then, the system provides the second data packet including the auxiliary information.

19 Claims, 4 Drawing Sheets

| AUXILIARY INFORMATION 410-1 | CRYPTOGRAPHIC ACCELERATOR/HANDLER 412-1 | ACCELERATOR PROVIDER 414-1 | RANDOM NUMBER GENERATOR 416-1 | ... |
|---|---|---|---|---|
| AUXILIARY INFORMATION 410-2 | NUMBER OF BYTES TRANSFORMED 418-1 | COST OF TRANSFORMATION 420-1 | PROCESSOR UTILIZATION 422-1 | |

AUXILIARY INFORMATION 410-1:
- CRYPTOGRAPHIC ACCELERATOR/HANDLER 412-1
- ACCELERATOR PROVIDER 414-1
- RANDOM NUMBER GENERATOR 416-1
- NUMBER OF BYTES TRANSFORMED 418-1
- COST OF TRANSFORMATION 420-1
- PROCESSOR UTILIZATION 422-1
- ...

AUXILIARY INFORMATION 410-2

USER ACCOUNT 510-1:
- CRYPTOGRAPHIC TRANSFORMATION(S) 512-1
- CHARGES 514-1
- BUDGET (OPTIONAL) 516-1
- ...

USER ACCOUNT 510-2

...

TRACKING OF RESOURCE UTILIZATION DURING CRYPTOGRAPHIC TRANSFORMATIONS

BACKGROUND

1. Field of the Invention

The present invention relates to techniques for exchanging and aggregating information associated with cryptographic transformations.

2. Related Art

The recent proliferation of computer networks and associated advances in networking technology are enabling businesses to improve their services and to offer new services. For example, banks can now provide consumers with the ability to access their bank records and to perform transactions online. However, the ability to exchange such sensitive information over networks creates significant security risks. Indeed, in the wrong hands personal financial information can be used for hacking, identity theft, and other types of criminal activity. To address this problem, systems commonly use encryption to protect data that is transmitted over networks.

Unfortunately, cryptographic transformations such as those used in encryption and decryption are computationally intensive. As a consequence, these transformations place significant demands on system resources and are a dominant expense in the processing of data packets. In order to manage systems that perform such cryptographic transformations effectively, it is desirable for the associated resource utilization to be accurately measured. However, the statistics that are measured in existing systems are typically limited to data-packet or byte counts. The actual cost incurred by the system cannot be determined using this information, because the cost also depends on whether or not cryptography was employed, and if so, on what cryptographic technique is used.

For example, the processing of network data packets may involve asynchronous-cryptographic operations. These operations often run in a context that is disconnected from the application that consumes the data packets. The ability to effectively manage the associated data flow requires the system to accurately account for resources used or spent by the system to process the data packets. However, in the case of cryptographic asynchronous processing operations these costs are not attributable to the application that generated the data flow. Instead, when executed in software, asynchronous cryptography requests are run in the context of a process (such as a system daemon) that sits idly in the background of the operating system until it is invoked to perform its task, and is then charged for the associated cost. And when offloaded to a hardware cryptographic accelerator, the scheduling cost and time spent in callbacks is diluted in measurement of the overall system overhead.

Therefore, in the absence of the ability to accurately monitor cryptographic resource utilization, the increasing use of encrypted data poses challenges to the operators of networks. In particular, it is difficult for the operators to determine cryptographic resource needs, to optimize data processing using the existing resources, to account for expenses, and to provide economic incentives for users to use cryptographic resources efficiently.

Hence what is needed is a method and an apparatus that facilitates the tracking of resource utilization during cryptographic transformations without the above-described problems.

SUMMARY

One embodiment of the present invention provides a computer system that communicates cryptographic resource utilization information while processing data packets. During operation, the system receives a first data packet and generates a second data packet by performing a cryptographic transformation on the first data packet. Next, the system appends auxiliary information to the second data packet. This auxiliary information includes information associated with cryptographic resource utilization during the cryptographic transformation. Then, the system provides the second data packet including the auxiliary information.

In some embodiments, the cryptographic transformation involves decryption and/or encryption of the first data packet, and may be performed, at least in part, in hardware and/or in software. Furthermore, the cryptographic transformation may involve an asynchronous cryptographic process.

In some embodiments, the auxiliary information is appended in response to a received command. Furthermore, in some embodiments the auxiliary information specifies a type of cryptographic accelerator, a provider of the cryptographic accelerator, a type of random number generator, a cost of the cryptographic transformation, a number of bytes transformed, and/or processor utilization during the cryptographic transformation. And in some embodiments, the system aggregates auxiliary information associated with multiple data packets.

In some embodiments, the first data packet is received and/or the second data packet is provided over a network.

In some embodiments, the system determines a user account balance based on the auxiliary information to enable billing based on usage of cryptographic resources. The system may provide the user account balance in response to a user request.

In some embodiments, the system determines performance of the system and/or a resource utilization in the system based on the auxiliary information.

In some embodiments, the system migrates additional cryptographic transformations of subsequent data packets to additional cryptographic resources based on the auxiliary information. And in some embodiments, the system restricts subsequent access of a user to cryptographic resources based on the auxiliary information.

Another embodiment provides a method including at least some of the above-described operations.

Another embodiment provides a computer program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems and processes may be used to communicate cryptographic resource utilization when processing data packets. In particular, after encrypting or decrypting an initial data packet that is received, the system may append auxiliary information to a resulting data packet which is then transmitted. This auxiliary information includes information associated with cryptographic resource utilization during the cryptographic transformation. For example, for cryptographic transformations performed, at least in part, in software, the auxiliary information may include a cost of the cryptographic transformation, a number of bytes transformed, and/or processor utilization during the cryptographic transformation. And for cryptographic transformations performed, at least in part, in hardware, the auxiliary information may specify a type of cryptographic accelerator, a provider of the cryptographic accelerator, a number of bytes transformed, a type of random number generator, and/or a cost of the cryptographic transformation. In an illustrative embodiment, the cryptographic transformation includes an asynchronous cryptographic process.

The system may use the auxiliary information to determine system performance, to determine a resource-utilization margin in the system, and/or to determine a user account balance to enable billing based on usage of cryptographic resources. Furthermore, by using the auxiliary information the system may migrate additional cryptographic transformations of subsequent data packets to additional cryptographic resources and/or restrict subsequent access of a user to cryptographic resources.

The data packets may be received and transmitted over a network, such as the Internet or World Wide Web (WWW), an Intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

Figure 1:
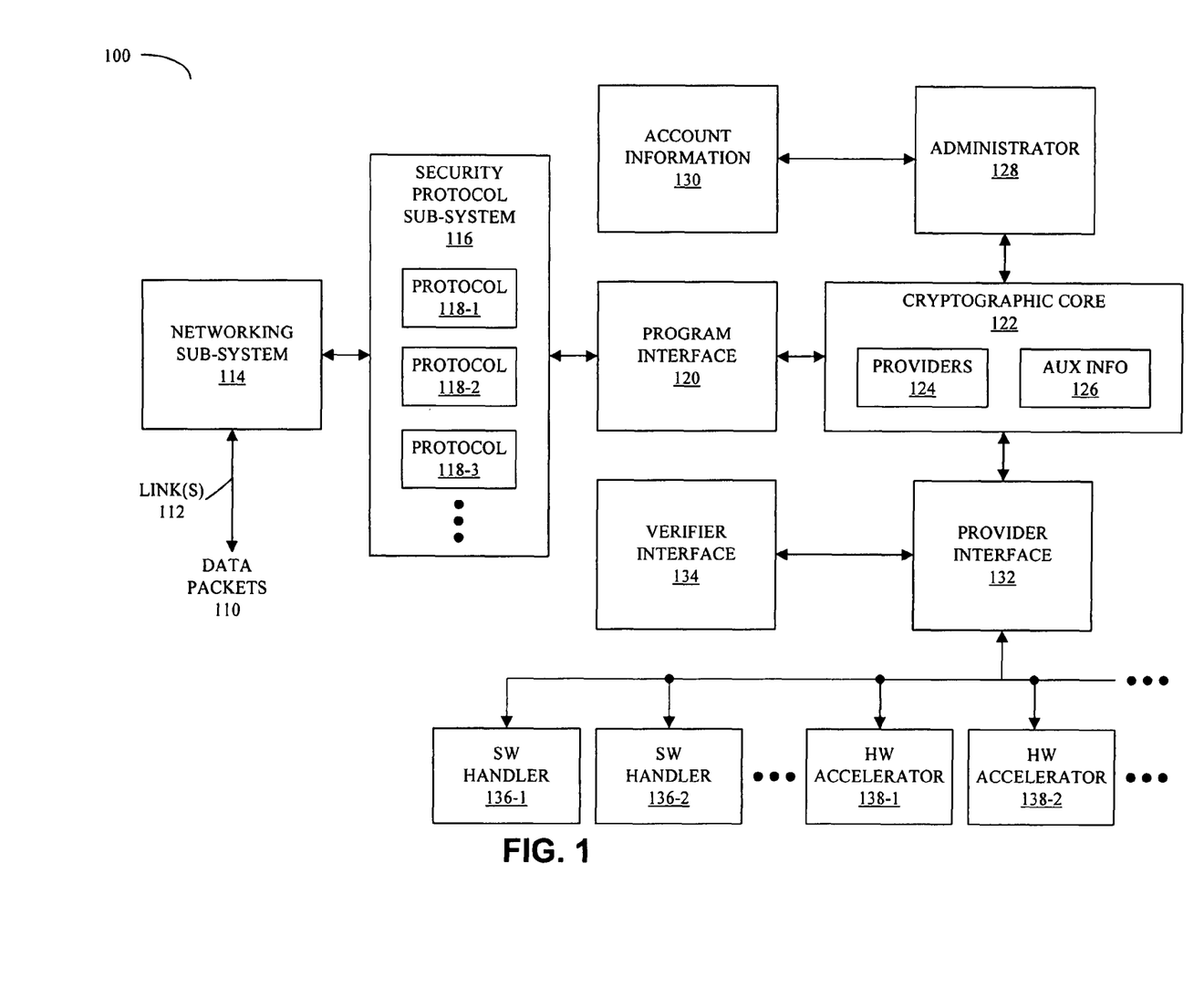
FIG. 1 is a block diagram illustrating a computer system in accordance with an embodiment of the present invention.

We now describe embodiments of a computer system, a method, and software for communicating cryptographic resource utilization. FIG. 1 provides a block diagram illustrating a computer system 100 including cryptographic-framework components in accordance with an embodiment of the present invention. In this architecture, data packets 110 from consumers (i.e., customers using the computer system 100) are transmitted and received by a networking sub-system 114 via link(s) 112. The link(s) 112 may use one or more communication protocols (such as time domain multiplexing, frequency domain multiplexing, and/or code division multiple access) and may include one or more types of links (including wireless and/or wired links, such as coaxial cable or optical fiber). In an exemplary embodiment, the networking sub-system 114 includes one or more network interface cards (NICs), i.e., circuit boards that include components necessary for sending and receiving the data packets 110, which are plugged into available slots in an expansion bus and are coupled to the link(s) 112.

After demodulating or decoding the format used in the communication protocol(s), the data packets 110 are processed in a security protocol sub-system 116 using one or more protocols 118. These protocols 118 may include Internet Protocol Security (IPsec), which is a network or data-packet level protocol that provides confidentiality and authentication in which the integrity of transmitted data is verified. (This protocol is widely used to implement Virtual Private Networks.) In addition, the protocols 118 may include Kerberos, a secure technique for authenticating a request for a service in a computer system, such as the computer system 100.

Using program interface 120, data packets 110 from consumers may access one or more cryptographic processes based on an associated service request. In an exemplary embodiment, the program interface 120 is implemented at the kernel-level in the operating system in the computer system 100.

Cryptographic core 122 schedules one or more cryptographic transformations during these cryptographic processes and ensures that the resulting load on the resources in the computer system 100 is balanced. For example, a given cryptographic transformation may be performed by calling a kernel-level consumer function implemented either using handling code in the operating system, or using an external accelerator. In response, a request may be generated for subsequent scheduling. As discussed below, in some embodiments the best provider of a cryptographic accelerator may be selected prior to scheduling.

In some embodiments, the entire kernel of the operating system in the computer system 100 resides in a protected address space. As a consequence, the cryptographic transformations may be implemented as multiple threads running in parallel on different processors that attempt to simultaneously operate on the same data packet(s). The cryptographic core 122 may maintain a global queue of asynchronous requests that can be honored only by software (SW) handler (i.e., programs or modules that execute in the environment of the operating system), and may also maintain one queue per registered hardware (HW) accelerator for the requests assigned to it. Furthermore, one kernel thread may be associated with the queue for a corresponding HW cryptographic accelerator.

Note that a task of the cryptographic core 122 is to keep each HW cryptographic accelerator 'fed' so as to maximize its usage. In addition, a global software queue in the operating system is serviced by a pool that includes a variable number of kernel threads (which may be created by a user daemon that starts at boot time). This allows the computer system 100 to limit the allocation of processor resources when processing cryptographic operations in the kernel. Therefore, these threads are created, as needed, as cryptographic demand increases. In this way, use of all of the processors in the computer system 100 is maximized.

In some embodiments, the cryptographic core 122 may use one or more look-up tables of providers 124 when performing the scheduling and load balancing functions. In particular, using the look-up table 124 the cryptographic core 122 may efficiently determine those cryptographic accelerators capable of handling a request, and then dispatch a call to the most appropriate accelerator or queue a request for later scheduling. For example, each entry in the look-up table 124 may point to a chain of descriptors for providers of the corresponding cryptographic accelerators. Thus, when handling a request for a Message Digest number 5 (MD5) technique, only accelerators from providers that advertise the ability to handle this mechanism will be considered. Information included in the chain of descriptors may also determine if the identified cryptographic accelerator(s) are also configured to handle a specific request (for example, based on packet-size limitations, data types, etc.)

The cryptographic transformations may include hash functions, encryption and/or decryption performed using a given technique. Techniques may include MD5, Secure Hashing Algorithm (SHA-1), Data Encryption Standard (DES), Rivest Cipher 4 (RC4), Rivest Shamir Adleman (RSA), and/or Rijndael Advanced Encryption Standard (AES). Also note that encryption and decryption may be symmetric and/or asymmetric. In the former, encryption and decryption are performed using the same key. In the latter, encryption and decryption are performed using two different keys, one of which is referred to as the public key and the other is referred to as the private key. Asymmetric encryption is also known as public-key encryption.

The cryptographic transformations may be performed by one or more of the cryptographic accelerators, including SW cryptographic handlers 136 and/or HW cryptographic accelerators 138. Therefore, in some embodiments the operating system executing in the computer system 100 may support a pseudo device driver that provides an interface to a public key cryptography standard (PKCS). PKCS is a collection of industry standards for computer security in general that have been fostered by RSA Laboratories. These standards specify programming interfaces used to access services offered by hardware cryptographic devices, such as HW accelerators 138. In an exemplary embodiment, the pseudo device driver supports PKCS #11.

The SW cryptographic handlers 136 and/or HW cryptographic accelerators 138 may be accessed via a provider interface 132. Note that these accelerators are different in terms of the capabilities they offer, their limitations, in the way they operate, and in the way they interact with their environment (i.e., the way they interact with the operating system kernel).

A SW cryptographic handler (such as SW cryptographic handler 136-1) is a loadable kernel module capable of offering cryptographic transformations. SW cryptographic handler 136-1 may be viewed as a kernel-level library that implements a set of techniques or mechanisms, for example, those defined by PKCS #11. In an exemplary embodiment, SW cryptographic handler 136-1 is a monolithic module that contains an implementation of one cryptographic technique, but which may include different modes of operation. Typically, the SW cryptographic handlers 136 operate in a synchronous way, i.e., a call to SW cryptographic handler 136-1 does not return before completion of the associated cryptographic transformation. In the context of parallel processing or a multi-threaded environment, execution continues on the same thread such that no additional requests are queued to SW cryptographic handler 136-1. In contrast with the HW cryptographic 138 accelerators described below, SW cryptographic handlers 136 do not maintain a state for their callers.

A HW cryptographic accelerator (such as HW cryptographic accelerator 138-1) is a device capable of cryptographic transformations. Such a device is accessed by the operating system kernel through a node in the device tree and by using the corresponding device driver. Depending on the price and the intended use, HW cryptographic accelerator 138-1 may have a single capability (for example, one random-number generator chip) or many techniques or mechanisms (such as a multi-purpose cryptographic accelerator). For most types of cryptographic operations, the HW cryptographic accelerators 138 operate in an asynchronous mode, i.e., a call to HW cryptographic accelerator 138-1 is not guaranteed to be completed upon return. Some of the HW cryptographic accelerators 138 may require a session to be established first and handle requests on a per session basis. However, some of the HW cryptographic accelerators 138 may operate in a session-less mode, where all the needed information is presented to these accelerators along with the context.

Note that in some embodiments the computer system 100 may allow pending portions of a multi-part cryptographic operation to be canceled before they are completed (for example, using a SA-delete command in IPsec). Thus, in some embodiments SW cryptographic handler 136-1 may be unloaded and/or HW cryptographic accelerator 138-1 may be dynamically reconfigured during at least a portion of a group of cryptographic transformations.

After the cryptographic transformations are performed, the resulting data packets may be checked by routing the data packets elsewhere in the computer system 100 using the verifier interface 134. In addition, as discussed further below, the cryptographic core 122 may collect or assemble associated auxiliary information 126 during the cryptographic transformations that are performed on the data packets 110.

For a SW cryptographic handler, the auxiliary information 126 may include the type of cryptographic transformation (encryption, decryption, a Hash-Based Message Authentication Code, digest, sign, and/or verify), a cost of the cryptographic transformation, a number of bytes transformed, and/or processor utilization during the cryptographic transformation (such as a time in nanoseconds spent on the request). And for cryptographic transformations performed, at least in part, using a HW cryptographic accelerator, the auxiliary information 126 may specify a mechanism or technique used in the cryptographic accelerator, the type of cryptographic transformation (encryption, decryption, a Hash-Based Message Authentication Code, digest, sign, and/or verify), a provider of the cryptographic accelerator, a number of bytes transformed, a type of random number generator, a random number used (if any), and/or a cost of the cryptographic transformation.

This auxiliary information 126 may be appended to corresponding data packets 110 after processing, i.e., after the cryptographic transformation(s) has occurred. For example, the auxiliary information 126 may be appended in response to a consumer request. Alternatively, the auxiliary information 126 may be appended in response to a request from an administrator 128 or another component in the computer system 100 (such as the networking sub-system 114 or one of the protocols 118 in the security protocol sub-system 116). Then, the data packets 110 and auxiliary information 126 may be transmitted using the networking sub-system 114.

As noted above, computer system 100 may also include administrator 128 that is configured to regulate the performance (such as resource utilization) and to determine system margin for the entire cryptographic framework. In this regard, the auxiliary information 126 may allow the administrator 128 to monitor and control the performance of the computer system 100. For example, the administrator 128 may be able to test performance or diagnose problems. In addition, the administrator 128 may determine which cryptographic mechanisms or techniques are supported, may determine usage statistics (such as the number of successful and/or failed cryptographic operations), may change or add HW cryptographic accelerators 138, and/or may change the number of processors dedicated for SW cryptographic threads, as needed, with minimal disruption.

In some embodiments, the administrator 128 aggregates auxiliary information 126 associated with multiple data packets. For example, the aggregated auxiliary information 126 may include that associated with data flows for a virtual NIC, data flows for a given protocol (such as all User Datagram Protocol traffic), and/or data flows for a given service (such as that defined by a transport port). The results may be stored with account information 130. The account information 130 may enable billing of the appropriate consumer associated with a data flow (for example, using an accounting module) based on the consumer's use of system resources. For example, some cryptographic transformations are more expensive than others. These costs may, at least in part, be passed on to the consumer(s). In this way, the consumers may be provided with an incentive to conserve such resources. In addition, the account information 130 may be provided to corresponding consumers at the request of the consumers. This may allow the consumers to plan their budgets and predict costs.

In some embodiments, service providers (such as cellular telephone carriers) may use the auxiliary information 126 and/or the account information 130 to bill users based on the type of data they are communicating over a cellular network. In short, this information may enable a new paradigm in which not all data is billed in the same way.

Furthermore, the administrator 128 may use the auxiliary information 126 to dynamically configure the cryptographic framework. For example, additional cryptographic transformations of subsequent data packets may be migrated to additional cryptographic resources based on the auxiliary information 126 for a current data packet. In this way, a stream of data packets may be migrated in memory to be closer to the associated cryptographic accelerator(s) or may be offloaded to another sub-system based on resource utilization. And in some embodiments, the system restricts subsequent access of a consumer to cryptographic resources based on the auxiliary information 126.

Note that in some embodiments the computer system 100 includes fewer or additional components, two or more components are combined into a single component, and/or a position of one or more components may be changed.

In an exemplary embodiment, a HW cryptographic accelerator, such as the HW cryptographic accelerator 138-1, is used to perform an RSA cryptographic transformation based on a kernel-level Secure Socket Level (SSL) protocol. During the SSL handshake phase, a client (i.e., a consumer) and the computer system 100 establish a common secret that both will use later to derive keying materials (keys for encryption and authentication, and initialization vectors). The common secret (also called a pre-master secret) is encrypted before it is communicated to the computer system 100 such that an eavesdropper cannot figure out its value. During this process, the client generates a random string of bytes and uses a public key provided by the computer system 100 (for example, in a certificate that was previously sent to the client) to encrypt the pre-master secret with the RSA asymmetric technique. Then, the encrypted pre-master secret is sent to the computer system 100 in an SSL handshake message called a CLientKeyExchange message. For example, this message may have the format SSL header {msg type=SSL Handshake, version=3.1, length=50, Handshake payload {HandShake type=ClientKeyExchange, Encrypted Pre-master secret (48 bytes)}}.

The computer system 100 receives the CLientKeyExchange message, and submits a request for its decryption in order to recover the pre-master secret. In particular, the networking sub-system 114 receives the Transmission Control Protocol (TCP) packet carrying the ClientKeyExchange SSL message. This data packet is delivered to the SSL connection or proxy in the security protocol sub-system 116. The SSL connection belongs to the SSL flow, and the TCP connection structure points to a flow structure that represents the SSL flow. TCP recognizes a packet coming to the SSL proxy, so it passes it to the proxy code that constructs a request. This request includes a pointer to the encrypted pre-master secret, uses a private key that was previously initialized with the private key of the computer system 100 (which corresponds to the public key included in the certificate), and requests that auxiliary information 126 be appended to the results of the cryptographic transformation.

The kernel of the cryptographic framework checks for the request for auxiliary information 126. If it is set, time readings when the asynchronous request is sent and returned from the hardware RSA accelerator are determined. These time readings are included in the auxiliary information 126. In addition, when the RSA hardware accelerator finishes the decryption, it notifies the kernel of the cryptographic framework, which sets the rest of fields in the auxiliary information 126. For example, the auxiliary information 126 also includes that the RSA hardware accelerator has preformed RSA decryption of 48 bytes. Then, the framework notifies the SSL proxy code of the completion of the job and the result of the decryption. In turn, the proxy returns the auxiliary information 126 to TCP, which updates the flow structure for SSL by charging it the costs (CPU time and provider usage). Observation tools in the administrator 128 that display the list of flows will report the cumulative time and other resources spent per cryptographic transformation for each flow.

In another exemplary embodiment, a SW cryptographic handler, such as the SW cryptographic handler 136-1, is used to perform Hash-Based Message Authentication Code (HMAC) for IPsec. A data packet is received by the networking sub-system 114 over an IPsec tunnel interface that was configured with an IPsec AH (Authentication Header) in tunnel mode, and with SHA-1 as the negotiated authentication technique. The flow structure for that tunnel is pointed to by an interface descriptor structure in the provider interface 132.

Then, the data packet is submitted for authentication. A cryptographic data set is constructed for the authenticated payload, the authentication key is retrieved from the tunnel's security association structure, and a request is constructed. In this case, no hardware accelerators that support SHA-1 are available on the computer system 100. Therefore, the data packet is queued to the software queue of cryptographic asynchronous requests. Later, a thread picks up the request, takes a time reading, and synchronously submits it to the SHA-1 software accelerator.

When this accelerator has completed the cryptographic transformation, it returns to the caller (the worker thread), which takes a second time reading and updates the auxiliary information 126 associated with the request to include the total time spent performing the HMAC verification. Then, the worker thread returns control back to the IPsec code in the security protocol sub-system 116. The IPsec code updates the flow structure of the tunnel by charging it the cost of the operation. In this case, observation tools in the administrator 128 will show the processor time spent performing SHA-1 authentication on behalf of the tunnel's flow.

Figure 2:
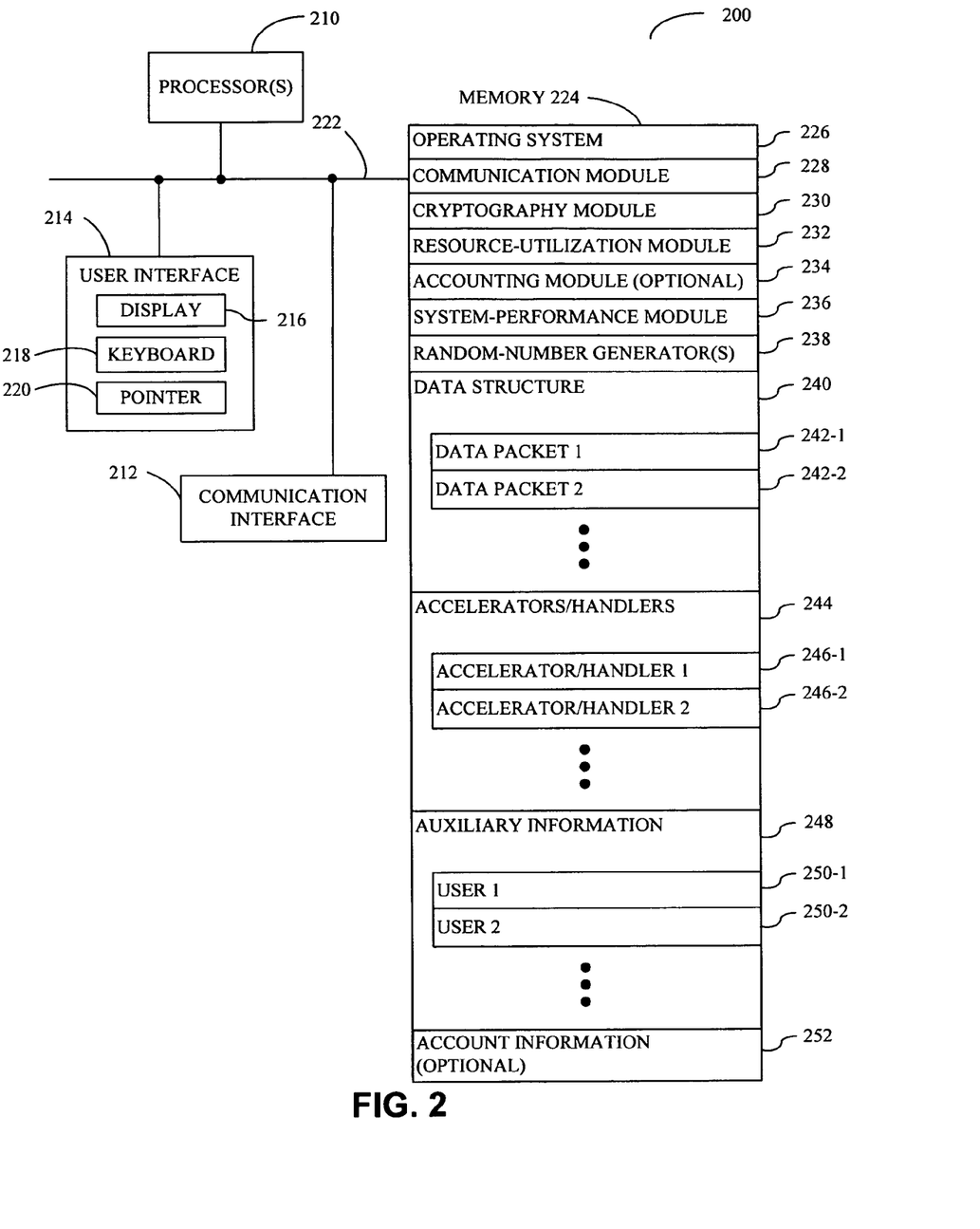
FIG. 2 is a block diagram illustrating a computer system in accordance with an embodiment of the present invention.

FIG. 2 provides a block diagram illustrating a computer system 200 (such as the computer system 100) in accordance with an embodiment of the present invention. The computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include a display 216, a keyboard 218, and/or a pointer 220, such as a mouse.

Memory 224 (which we interchangeably call a computer-readable storage medium) in the computer system 200 may include volatile memory and/or non-volatile memory. More specifically, memory 224 may include ROM, RAM, EPROM, EEPROM, FLASH, one or more smart cards, one or more magnetic disc storage devices, and/or one or more optical storage devices. Memory 224 may store an operating system 226 that includes procedures (or a set of instructions) for handling various basic system services for performing hardware dependent tasks. The memory 224 may also store procedures (or a set of instructions) in a communication module 228. The communication procedures may be used for communicating with one or more computers and/or servers, including computers and/or servers that are remotely located with respect to the computer system 200

Memory 224 may also include multiple program modules (or a set of instructions), including cryptography module 230 (or a set of instructions), resource-utilization module 232 (or a set of instructions), optional accounting module 234 (or a set of instructions), and/or system-performance module 236 (or a set of instructions). Furthermore, memory 224 may include one or more random number generators 238 and/or optional account information 252.

Cryptography module 230 may use one or more of accelerators/handlers 246 in accelerators/handlers 244 to perform cryptographic transformation on one or more data packets 242 in data structure 240. During these transformations, auxiliary information 248 for one or more users 250 may be determined.

Instructions in the various modules in the memory 224 may be implemented in a high-level procedural language, an object-oriented programming language, and/or in an assembly or machine language. The programming language may be compiled or interpreted, i.e, configurable or configured to be executed by the one or more processing units 210.

Although the computer system 200 is illustrated as having a number of discrete components, FIG. 2 is intended to be a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

The computer system 200 may include fewer components or additional components, two or more components may be combined into a single component, and/or a position of one or more components may be changed. In some embodiments the functionality of the computer system 200 may be implemented more in hardware and less in software, or less in hardware and more in software, as is known in the art.

Figure 3:
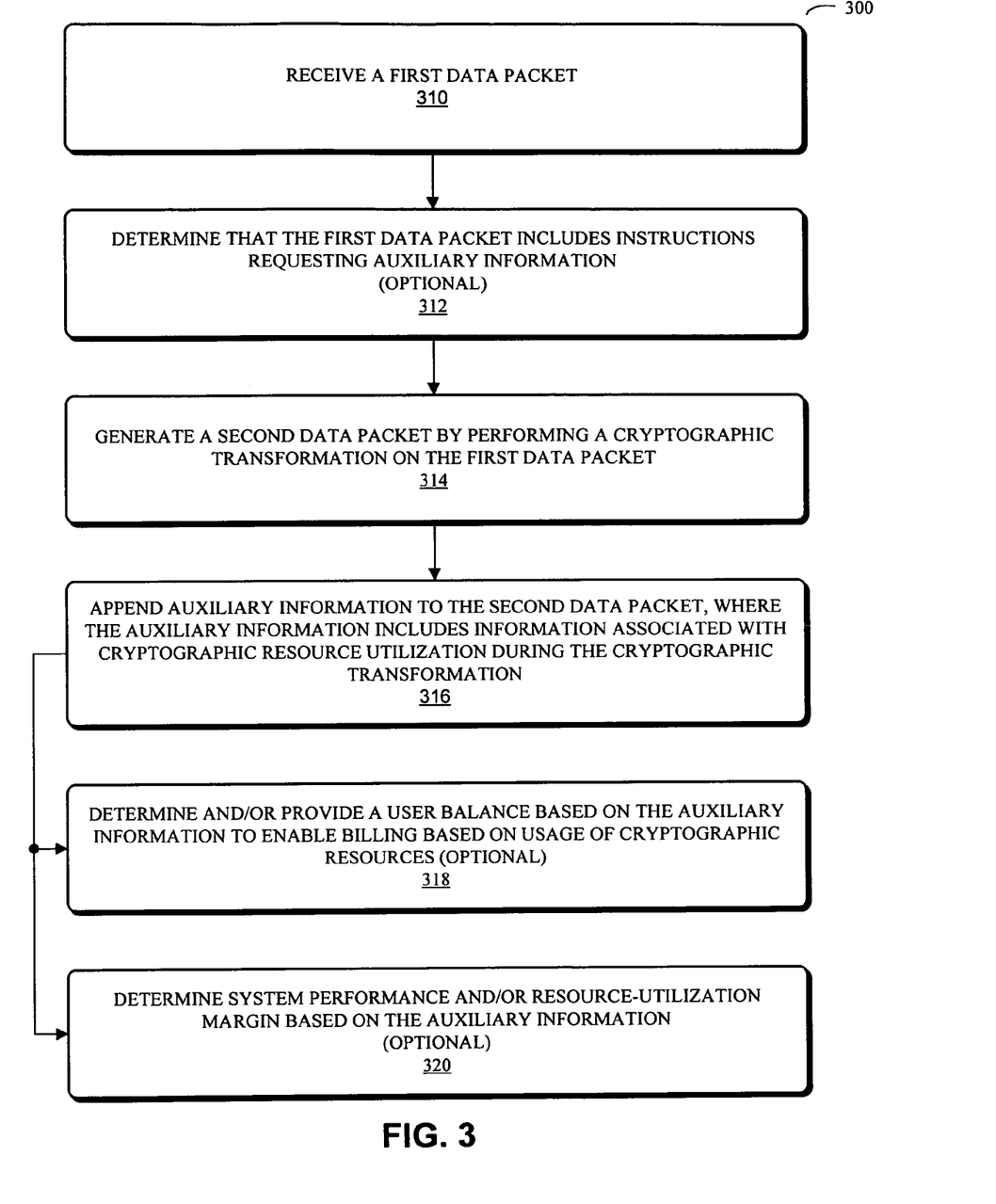
FIG. 3 is a flow chart illustrating a process for communicating resource utilization in accordance with an embodiment of the present invention.

We now discuss methods for communicating cryptographic resource utilization. FIG. 3 provides a flow chart illustrating a process 300 for communicating resource utilization in accordance with an embodiment of the present invention. During this process, the system receives a first data packet (310), optionally determines that the first data packet includes instructions requesting auxiliary information (312), and generates a second data packet by performing a cryptographic transformation on the first data packet (314). Then, the system appends auxiliary information to the second data packet (316). This auxiliary information includes information associated with cryptographic utilization during the cryptographic transformation. In some embodiments, the system optionally determines and/or provides a user balance based on the auxiliary information to enable billing based on usage of cryptographic resources (318). And in some embodiments, the system optionally determines system performance and/or resource-utilization margin based on the auxiliary information (320). Note that in some embodiments there may be additional or fewer operations, the order of the operations may be changed, and two or more operations may be combined into a single operation.

Figure 4:
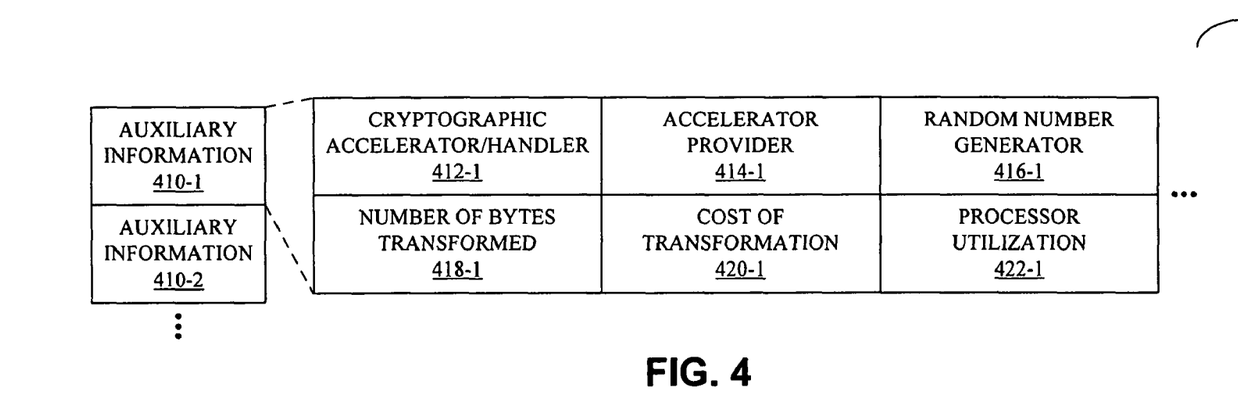
FIG. 4 is a block diagram illustrating a data structure in accordance with an embodiment of the present invention.

We now discuss data structures that may be used in the computer system 100 (FIG. 1) and/or 200 (FIG. 2). FIG. 4 provides a block diagram illustrating a data structure 400 in accordance with an embodiment of the present invention. This data structure may include auxiliary information 410. For example, auxiliary information 410-1 may include a cryptographic accelerator/handler 412-1 used, an accelerator provider 414-1, a random number generator 416-1 used, a number of bytes transformed 418-1, a cost of the transformation 420-1, and/or processor utilization 422-1.

Figure 5:
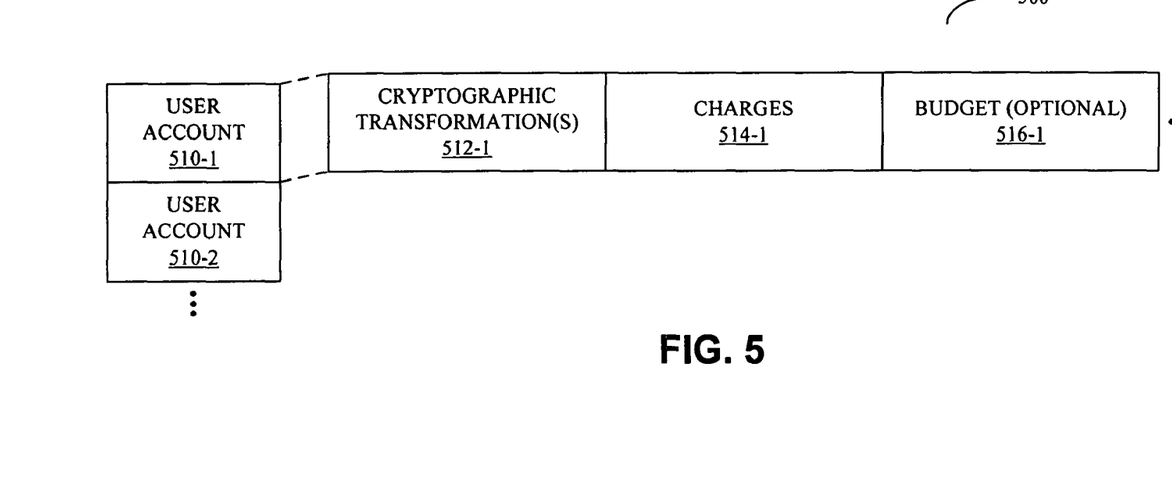
FIG. 5 is a block diagram illustrating a data structure in accordance with an embodiment of the present invention.

FIG. 5 provides a block diagram illustrating a data structure 500 in accordance with an embodiment of the present invention. This data structure may include information for user accounts 510, such as that in account information 130 (FIG. 1). For example, for user account 510-1, the account information may include cryptographic transformations 512-1, charges 514-1, and/or optional budget information 516-1. Note that that in some embodiments of the data structures 400 and/or 500 there may be fewer or additional components, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating cryptographic resource utilization, comprising:

receiving a first data packet from a first data flow;

generating a second data packet by performing a cryptographic transformation on the first data packet;

appending auxiliary information to the second data packet, wherein the auxiliary information includes information that describes a cost for the cryptographic transformation and specifies a type of random number generator used for the cryptographic transformation;

providing the second data packet including the auxiliary information;

aggregating auxiliary information from
  the second data packet,
  other cryptographically-transformed packets from the first data flow that comprise auxiliary information that describes a cost for the cryptographic transformation, and
  one or more additional cryptographically-transformed data packets from a second data flow that comprise auxiliary information that describes a cost for the cryptographic transformation, wherein the first data flow and the second data flow are for a same user; and
determining a user account balance based on the auxiliary information for the first data flow or the second data flow to enable billing based on usage of cryptographic resources for the first data flow or the second data flow.

2. The method of claim 1, wherein the cryptographic transformation involves decryption or encryption of the first data packet.

3. The method of claim 1, wherein the cryptographic transformation is performed, at least in part, in hardware.

4. The method of claim 1, wherein the cryptographic transformation is performed, at least in part, in software.

5. The method of claim 1, wherein the auxiliary information is appended in response to a received command.

6. The method of claim 1, wherein the first data packet is received over a network.

7. The method of claim 1, wherein the second data packet is provided over a network.

8. The method of claim 1, wherein the auxiliary information specifies a type of cryptographic accelerator and a provider of the cryptographic accelerator.

9. The method of claim 1, wherein the auxiliary information specifies a number of bytes transformed.

10. The method of claim 1, wherein the auxiliary information specifies processor utilization during the cryptographic transformation.

11. The method of claim 1, further comprising providing the user account balance in response to a user request.

12. The method of claim 1, further comprising determining system performance based on the auxiliary information.

13. The method of claim 1, further comprising determining a resource-utilization margin in a system based on the auxiliary information.

14. The method of claim 1, further comprising migrating additional cryptographic transformations of subsequent data packets to additional cryptographic resources based on the auxiliary information.

15. The method of claim 1, further comprising restricting subsequent access of a user to cryptographic resources based on the auxiliary information.

16. The method of claim 1, further comprising aggregating auxiliary information associated with multiple data packets.

17. The method of claim 1, wherein the cryptographic transformation includes an asynchronous cryptographic process.

18. A computer program product for use in conjunction with a computer system, the computer program product comprising a non-transitory computer-readable storage medium and a computer-program mechanism embedded therein for communicating cryptographic resource utilization, the computer-program mechanism including:
   instructions for receiving a first data packet from a first data flow;
   instructions for generating a second data packet by performing a cryptographic transformation on the first data packet;
   instructions for appending auxiliary information to the second data packet, wherein the auxiliary information includes information that describes a cost for the cryptographic transformation and specifies a type of random number generator used for the cryptographic transformation;
   instructions for providing the second data packet including the auxiliary information;
   instructions for aggregating auxiliary information from the second data packet,
      other cryptographically-transformed packets from the first data flow that comprise auxiliary information that describes a cost for the cryptographic transformation, and
      one or more additional cryptographically-transformed data packets from a second data flow that comprise auxiliary information that describes a cost for the cryptographic transformation, wherein the first data flow and the second data flow are for a same user; and
   instructions for determining a user account balance based on the auxiliary information for the first data flow or the second data flow to enable billing based on usage of cryptographic resources for the first data flow or the second data flow.

19. A computer system, comprising:
a processor;
memory;
a program module, wherein the program module is stored in the memory and configured to be executed by the processor, and wherein the program module is for communicating cryptographic resource utilization, the program module including:
instructions for receiving a first data packet from a first data flow;
instructions for generating a second data packet by performing a cryptographic transformation on the first data packet;
instructions for appending auxiliary information to the second data packet, wherein the auxiliary information includes information that describes a cost for the cryptographic transformation and specifies a type of random number generator used for the cryptographic transformation;
instructions for providing the second data packet including the auxiliary information;
instructions for aggregating auxiliary information from the second data packet,
   other cryptographically-transformed packets from the first data flow that comprise auxiliary information that describes a cost for the cryptographic transformation, and
   one or more additional cryptographically-transformed data packets from a second data flow that comprise auxiliary information that describes a cost for the cryptographic transformation, wherein the first data flow and the second data flow are for a same user; and
instructions for determining a user account balance based on the auxiliary information for the first data flow or the second data flow to enable billing based on usage of cryptographic resources for the first data flow or the second data flow.

* * * * *